United States Patent

Iijima et al.

[11] Patent Number: 5,996,552
[45] Date of Patent: Dec. 7, 1999

[54] FUEL INJECTION DEVICE FOR ENGINE WITH SUPERCHARGER AND METHOD FOR CONTROLLING THE SAME

[75] Inventors: Tadashi Iijima, Yuuki; Masaki Takahashi; Shinzo Watanabe, both of Oyama, all of Japan

[73] Assignee: Komatsu Ltd., Tokyo, Japan

[21] Appl. No.: 09/060,568

[22] Filed: Apr. 15, 1998

[30] Foreign Application Priority Data

Apr. 16, 1997 [JP] Japan ..................................... 9-114483

[51] Int. Cl.⁶ ........................................................ F02M 3/00
[52] U.S. Cl. ................ 123/339.18; 123/305; 123/339.16
[58] Field of Search .............................. 123/305, 399.16, 123/399.17, 399.18

[56] References Cited

U.S. PATENT DOCUMENTS

| | | | |
|---|---|---|---|
| 4,721,083 | 1/1988 | Hosaka | 123/339.17 |
| 5,730,105 | 3/1998 | McGinnity | 123/305 |
| 5,735,241 | 4/1998 | Matsuura | 123/305 |
| 5,749,334 | 5/1998 | Oda et al. | 123/305 |
| 5,797,367 | 8/1998 | Iida et al. | 123/305 |
| 5,878,711 | 3/1999 | Kamura et al. | 123/305 |
| 5,878,713 | 3/1999 | Kadota | 123/305 |

FOREIGN PATENT DOCUMENTS 279740  12/1961  Japan .

Primary Examiner—John Kwon
Attorney, Agent, or Firm—Sidley & Austin

[57] ABSTRACT

In an engine, which has a supercharger and which rotates a generator running at high-idle speed, the rotational speed of the supercharger is accelerated in advance before performing a fuel supply so as to prevent a sudden reduction in the rotational speed due to a suddenly increased load during starting and operating time. A fuel injection device (1), which injects a specified quantity of fuel into an engine cylinder at a specified fuel injection timing and discharges exhaust gas at a specified temperature when the engine is running at unloaded high-idle speed, includes an actuator (14) connected to an injector (13) for controlling fuel injection, a load sensor such as an engine speed sensor (41), and a controller (44) which signals the actuator to cause the actual fuel injection timing to be behind the specified fuel injection timing, hence increasing the exhaust gas temperature at the high-idle-running to be higher than the specified exhaust gas temperature. When the high-idle speed at the time of loading becomes lower than a specified threshold or the loading becomes more than a specified threshold, the controller signals the actuator to cause the actual fuel injection timing to be equal to or ahead of the specified fuel injection timing and to maximize the fuel injection.

12 Claims, 4 Drawing Sheets

FUEL INJECTION DEVICE FOR ENGINE WITH SUPERCHARGER AND METHOD FOR CONTROLLING THE SAME

FIELD OF THE INVENTION

The invention relates to a fuel injection device for an engine with a supercharger and a method for controlling the same. In particular, it relates to a fuel injection device for use with an engine having a supercharger and being adapted to rotate a generator or the like for running at high-idle speed without a sudden reduction in the rotational speed due to a suddenly increased load during its operating time, and a control method for the same.

DESCRIPTION OF THE RELATED ART

A well-known technique for controlling rotational speed of a generator is disclosed in Japanese Unexamined Patent Publication (A) 61-279740. This publication teaches a technique for improving the responsiveness to the control of the rotational speed by detecting a load variation in a generator; and, when the detected value is within a specified range, controlling by means of a governor the quantity of fuel injection so as to increase or decrease the quantity of fuel actually injected. Thus, when the detected value is more than the upper limit value, additional fuel is sprayed into the engine; when the detected value is less than the lower limit value, combustion in the engine is stopped for a specified period of time. Stated more specifically, when a load variation occurs, a difference (a velocity variation) between a torque variation produced by the engine and a torque variation of the generator is detected; and in order to solve this velocity variation, a fuel supply to the engine is controlled through the governor to increase or decrease. A load variation detecting device is also provided on the generator side, and a determination is made by a discriminator as to whether or not an output signal from the load variation detecting device is within a specified range with respect to a set load value. When the output signal is within the specified range, the control of the fuel supply is carried out by the governor alone. Further, when the output signal is more than the upper limit value of the range, an additional fuel injection device is operated; when the output signal is less than the lower limit value of the range, an engine stopping device is operated.

According to the publication, when a load variation is within a specified range, the quantity of fuel injection is controlled to increase or decrease. In such a case, if the load variation is more than the upper limit value, additional fuel is sprayed, and this causes slow responsiveness and a large reduction in the rotational speed. Particularly, in an engine for driving a generator, a variation of normal frequency outputted from the generator becomes large and the recovery time is made long.

SUMMARY OF THE INVENTION

In consideration of the above problems, the present invention relates to a fuel injection device for an engine with a supercharger and a method for controlling the same. In particular, an object of the present invention is to provide a fuel injection device, for use with an engine having a supercharger and being adapted to rotate a generator or the like, running at high-idle speed, and which accelerates the rotational speed of the supercharger in advance and supplies fuel so as to prevent a sudden reduction in the rotational speed due to a suddenly increased load during its operating time, and also to provide a method for controlling the same.

According to the present invention, a fuel injection device for an engine with a supercharger, which rotates the supercharger by injecting a specified quantity of fuel into a cylinder of the engine at a specified fuel injection timing and by discharging exhaust gas at a specified temperature when the engine is running at an unloaded high-idle speed, comprises: a unit injector, for injecting fuel into a cylinder of the engine; an actuator, for controlling the timing and the quantity of fuel injection into the cylinder of the engine; a suitable sensor for determining the load on the engine, e.g., an engine speed sensor for detecting a rotational speed of the engine, a torque sensor for detecting a load torque of the engine, or a current sensor for measuring a load current applied to the generator to be driven by the engine; and a controller, which outputs an instruction for the actuator to cause the actual fuel injection timing to occur behind (later than) the specified fuel injection timing and hence to increase the exhaust gas temperature at the high-idle-running to be higher than the specified exhaust gas temperature, and which, when the high-idle speed at the time of loading becomes lower than a specified threshold or the loading becomes more than a specified threshold, also outputs instructions for the actuator to cause the actual fuel injection timing to become equal to or ahead of (earlier than) the specified fuel injection timing as well as to increase the quantity of fuel injection to the maximum.

In the above structure, the supercharger is supplied with high-temperature exhaust gas and the rotational speed thereof is increased in advance by delaying the timing of fuel injection to the high-idling engine, hence increasing the exhaust gas temperature. When the engine is suddenly loaded, the engine speed and the engine output torque are detected; then when the generator is to be driven, a load applied on the generator is detected. If the load is more than the threshold, the engine output torque is increased in advance by supplying a large quantity of air through the supercharger running at the previously increased rotational speed. The conventional technique is to increase the rotational speed of the supercharger after detecting a decrease in the engine speed, whereas the present invention is to supply a large quantity of air through the supercharger running at the previously increased rotational speed. Thus the present invention prevents a delay in the increasing of the rotational speed of the supercharger and hence permits the engine output torque to be increased immediately. As a result, a drop in the engine speed is made small even when the engine is suddenly loaded, and hence a faster rise in the rotational speed of the supercharger is achieved. Since the rate of reduction in the engine speed can thus be improved by increasing the rotational speed of the supercharger at the high-idle running even when the engine is suddenly loaded, the recovery time is reduced and hence the responsiveness is improved. In particular, for use in an engine for driving a generator, a drop from normal frequency can be made small enough to greatly improve the recovery time to the normal frequency.

According to the present invention, a method of controlling a fuel injection device for an engine with a supercharger, which includes a step of rotating the supercharger by injecting a specified quantity of fuel into a cylinder at a specified fuel injection timing and by discharging exhaust gas at a specified temperature when the engine is running with no load and high-idle speed, comprises: the steps of causing the actual fuel injection timing to be behind (occur later than) the specified fuel injection timing and hence increasing the exhaust gas temperature at the high-idle-running so as to be higher than the specified exhaust gas temperature; and when the high-idle speed at the time of loading becomes lower than a specified threshold or the loading becomes more than a specified threshold, causing the actual fuel injection timing to become equal to or ahead of (occur earlier than) the specified fuel injection timing as well as increasing the quantity of fuel injection to the maximum.

As described above, in such a method, the supercharger is supplied with high-temperature exhaust gas and the rotational speed thereof is increased in advance by delaying the timing of fuel injection to the high-idling engine and hence increasing the exhaust gas temperature. Thus, when the engine is suddenly loaded, a drop in the engine speed is made small and hence a faster rise in the rotational speed of the supercharger is achieved. Since the rate of reduction in the engine speed can be improved by increasing the rotational speed of the turbosupercharger at the high-idle-running, even when the engine is suddenly loaded, the recovery time is reduced and hence the responsiveness is improved. In particular, for use in an engine for driving a generator, a drop from normal frequency can be made small enough to greatly improve the recovery time to the normal frequency.

PREFERRED EMBODIMENT OF THE INVENTION

Referring to FIGS. 1 to 6C, a description will be made of a fuel injection device for an engine with a supercharger and a method of controlling the same according to the present invention.

Figure 1:
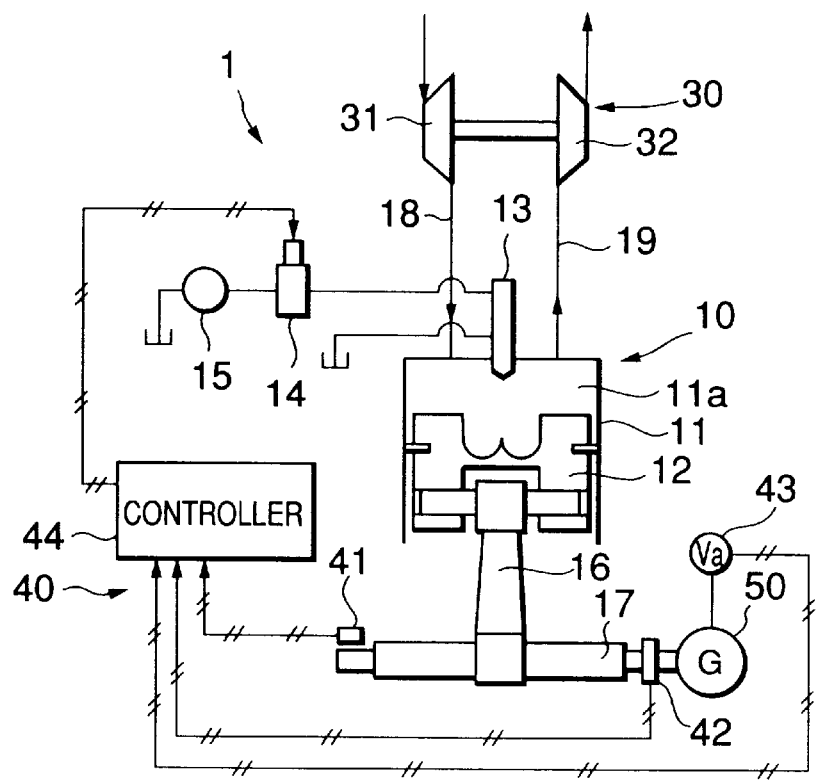
FIG. 1 is a diagram showing a general structure of a fuel injection device for an engine with a supercharger according to an embodiment of the present invention.

In FIG. 1, a fuel injection device 1 for an engine with a supercharger includes a diesel engine 10 (hereinafter, referred to as engine 10), a supercharger 30, a control unit 40, and a generator 50.

The engine 10 is constituted by at least one cylinder 11, a piston 12 for each cylinder 11 with the respective piston 12 being closely inserted into its cylinder 11 and being slidable vertically, a unit injector 13 for injecting fuel into each cylinder 11, an actuator 14 connected to the unit injector 13 for controlling the timing and the quantity of fuel injection into each cylinder 11, a fuel injection pump 15 connected to the actuator 14 for supplying fuel, a crank shaft 17 coupled to the piston 12 through a rod 16, a suction pipe 18 connected to the combustion chamber 11a of each cylinder 11 through an unillustrated valve, and an exhaust pipe 19.

The supercharger 30 is constituted by a blower 31, provided in the suction pipe 18 for compressing suction air; and a turbine 32, provided in the exhaust pipe 19 and rotated by exhaust gas so as to drive the blower 31. A solenoid valve, serving as the actuator 14, can be connected to the unit injector 13, or an electronic governor can be used as the actuator 14.

The control unit 40 is constituted of at least one suitable sensor for determining the load on the engine 10, e.g., an engine speed sensor 41, for detecting a rotational speed of the engine 10, a torque sensor 42, for detecting a load torque of the engine 10, or a current sensor 43, for measuring a load current applied to a generator to be described later; and a controller 44, for adjusting the timing of the opening and the closing of the actuator 14 in response to a signal from the sensor, and hence adjusting the timing of fuel injection. When the generator 50 is to be driven by the engine 10, the controller 44 controls the actuator 14 to supply fuel into each cylinder 11 such that the rotational speed at unloaded high-idle-running substantially corresponds to a rated rotational speed.

Figure 2:
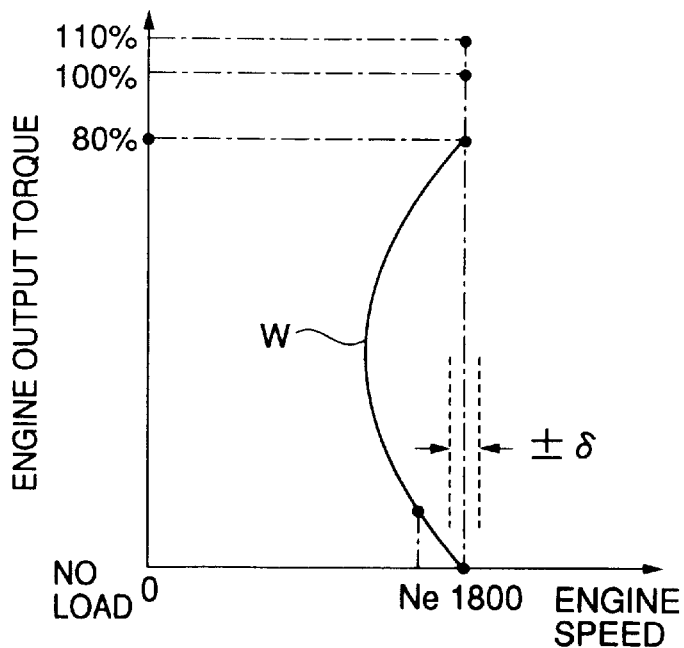
FIG. 2 is a graph for explaining changes in the rotational speed of the engine when loaded, unloaded, and suddenly loaded in the embodiment.

FIG. 2 is a graph for explaining changes in the rotational speed of the engine when unloaded, loaded, and suddenly loaded, which shows the rotational speed of the engine 10 in the abscissa and the output torque (quantity of fuel injection) of the engine 10 in the ordinate. Assuming that a load of 80% is suddenly applied on the engine 10 while the engine 10 is running at 1800 rpm from the unloaded condition to a 110% loaded condition, the change in the rotational speed relative to the output torque of the engine 10 is indicated by the solid curve W. Further, a range of allowed variations $\mp\delta$ in the rotational speed of the engine 10 is indicated by the dotted lines in FIG. 2.

The generator 50 is rotated by a driving force of the engine 10 so that a required frequency of electric power is generated and fed. The current sensor 43 is provided on the output side of the generator 50 for measuring a load current Va applied to the generator 50, i.e., for measuring a current Va generated by the generator 50. Normally, the generator 50 is rotated at high-idle speed when unloaded, while it shifts to the rated output when loaded. However, the controller 44 controls the actuator 14 to control the quantity of fuel injection such that the unloaded high-idle speed accords with the rated output.

Figure 3:
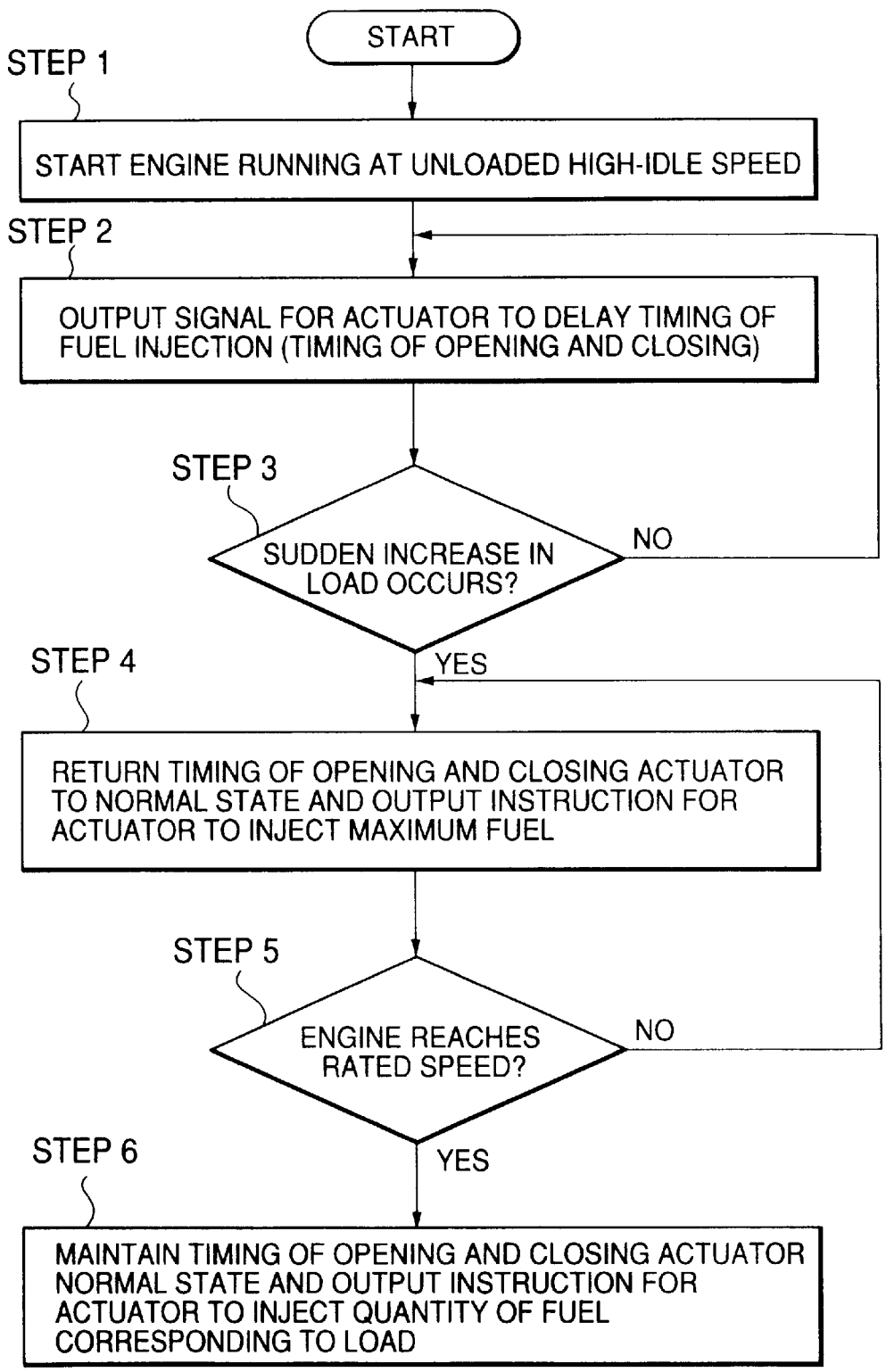
FIG. 3 is a flowchart showing a process of controlling the fuel injection device for the engine with the supercharger according to the embodiment.

Next, a method of controlling the fuel injection device 1 for the supercharged engine in the above structure will be described with respect to the flowchart of FIG. 3.

In step 1, the engine 10 is started and rotated at unloaded high-idle speed.

In step 2, the controller 44 adjusts the timing of the opening and the closing of the actuator 14 in response to a signal from the engine speed sensor 41 so as to cause the fuel injection timing to be a way behind (subsequent to) the timing of normal fuel injection.

Figure 4:
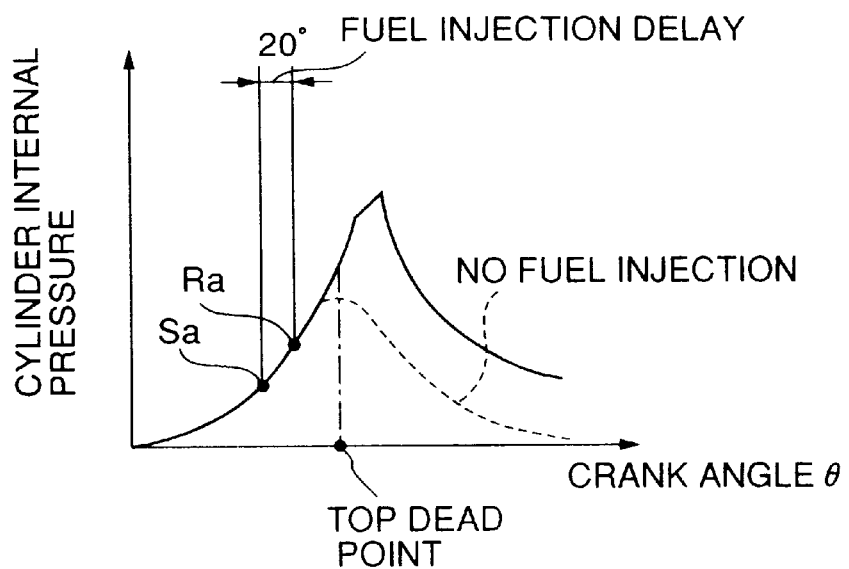
FIG. 4 is a graph for explaining the timing of fuel injection to the engine with the supercharger according to the embodiment.
Figure 5:
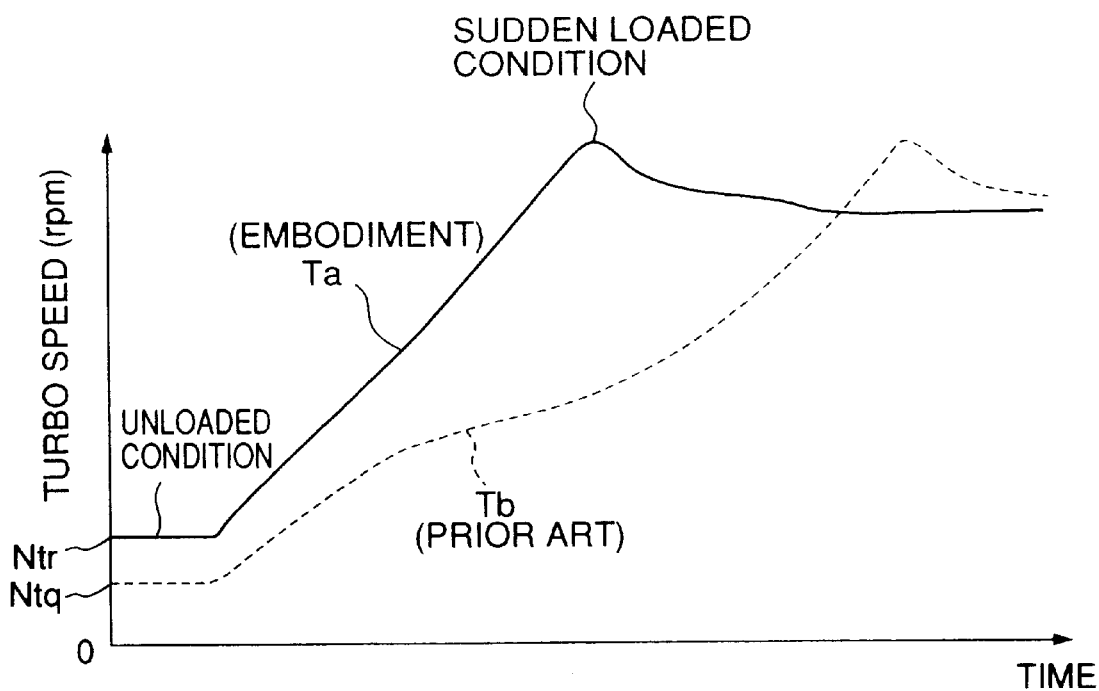
FIG. 5 is a graph for explaining the rotational speed of the supercharger provided for the engine according to the embodiment.

FIG. 4 is a graph for explaining a considerable delay in the timing of the fuel injection. In FIG. 4, the crank angle and the cylinder internal pressure are chosen as the abscissa and ordinate, respectively; and the timing of normal fuel injection is indicated by the point Sa, and the actual timing of starting fuel injection considerably delayed is indicated by the point Ra. In the present embodiment, the delay is given by a crank angle of about 20 deg, and hence the exhaust gas temperature to be discharged from the cylinder 11 rises considerably. For this reason, an unloaded high-idle speed Ntr of the turbine 32 becomes higher than a conventional rotational speed Ntq, as shown in FIG. 5, and hence air to be fed into the cylinder 11 increases. In FIG. 5, time and the turbocharger rotational speed are chosen as the abscissa and ordinate respectively, and a transition from the unloaded condition to a sudden loaded condition of the turbocharger rotational speed Ntr in the embodiment is indicated by the solid curve Ta and a transition from the unloaded condition to the sudden loaded condition of the conventional turbocharger rotational speed Ntq is indicated by the solid curve Tb. When compared, the turbocharger rotational speed Ntr of the embodiment is about 3000 rpm higher than the conventional turbocharger rotational speed Ntq.

In step 3, it is detected whether or not a sudden increase in load on the generator 50 occurs. For example, a sudden increase Za in load (80% increase) shown in FIG. 6A can be detected from a reduction in the rotational speed of the engine 10, as indicated by the solid curve Y in FIG. 6B. Specifically, the controller 44 can determine the reduction in the rotational speed of the engine 10, in response to a signal from the engine speed sensor 41, when the rotational speed of the engine 10 falls below a specified threshold (point Ne in FIG. 2). With a change in the current applied to the generator 50, the controller 44 can determine the change in the current, in response to a signal from the current sensor 43 for measuring the current applied to the generator 50, when the generated current Va exceeds a specified threshold Vc. With a change in the load torque of the engine 10, the controller 44 can determine the change in the load torque when a torque applied to the engine 10 is detected by the torque sensor 42 and the output torque T exceeds a specified threshold Tc.

In step 3, if no sudden increase in the load on the generator 50 occurs (if NO), the process flow returns to step 2. On the other hand, if a sudden increase in the load on the generator 50 occurs (if YES), the process flow goes to step 4.

Figure 6A:
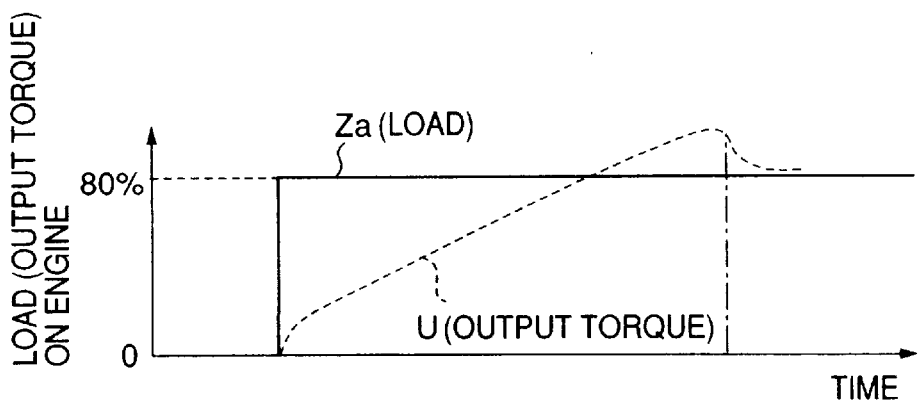
FIG. 6A is a graph for explaining a relationship between a suddenly increased load on the supercharged engine and the engine output torque in the embodiment.
Figure 6B:
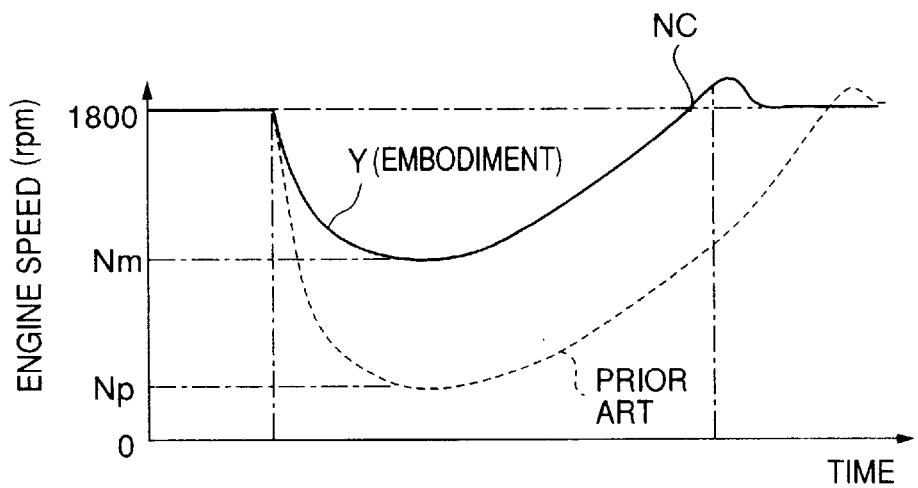
FIG. 6B is a graph for explaining a change in the rotational speed of the engine when suddenly loaded.
Figure 6C:
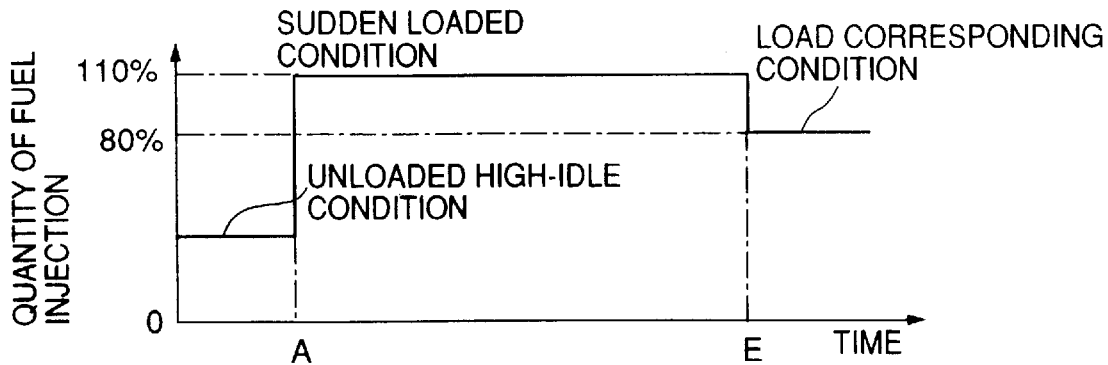
FIG. 6C is a graph for explaining a change in the quantity of fuel injection when suddenly loaded.

In step 4, the controller 44 adjusts the timing of the opening and the closing of the actuator 14 to be opened during the rated output time. In other words, the delay of the crank angle of about 20 deg given by the previous steps is eliminated and the actuator 14 is returned to the normal condition, while adjusting the degree of opening of the actuator 14 to the maximum quantity of fuel injection as shown in FIG. 6C (110% in FIG. 6C). As a result, the quantity of fuel injection into the cylinder 11 becomes the maximum, and hence the exhaust gas temperature rises. Then, the turbine 32, rotated by the exhaust gas, speeds up to increase the air to be fed into the cylinder 11, and hence the output torque as indicated by the dotted curve U in FIG. 6A. In this case, since such change in the load occurs suddenly, the generator 50, i.e., the engine 10, decelerates to a specified rotational speed Nm, as indicated by the solid curve Y in FIG. 6B. However, the drop to the specified rotational speed Nm is made to be much smaller than the drop to a rotational speed Np of a conventional engine. The reason is that the timing of the opening and the closing of the actuator 14 is considerably delayed by a specified amount before accelerating the rotational speed of the turbocharger by a specified amount.

In step 5, the controller 44 determines whether or not the rotational speed of the engine 10 is rising (as indicated by the solid curve Y in FIG. 6B) and reaches the rated rotational speed Nc. If lower than the rated rotational speed Nc in step 5 (if NO), the controller 44 returns to step 4. If the rotational speed of the engine 10 reaches the rated rotational speed Nc (if YES), the controller goes to step S6.

In step 6, the controller 44 adjusts the timing of the opening and the closing of the actuator 14 to be opened during the rated output time, while adjusting the degree of opening of the actuator 14 to a quantity of fuel injection corresponding to the load. For example, the degree of opening of the actuator 14 is adjusted such that the quantity of fuel injection becomes 80% at point E in FIG. 6C. Thus, the engine 10 outputs a torque corresponding to the load and runs at the rotational speed Nc (e.g., 1800 rpm) when rated power is outputted, and thereby the generator 50 generates a generated current Va corresponding to the load.

What is claimed is:

1. Apparatus comprising:
   an engine having at least one cylinder and a supercharger;
   a fuel injection device for rotating the supercharger by injecting a specified quantity of fuel into said at least one cylinder at a specified fuel injection timing and discharging exhaust gas at a specified exhaust gas temperature when the engine is running at an unloaded high-idle speed, said fuel injection device comprising:
   a unit injector for injecting fuel into said cylinder;
   an actuator for controlling a timing and a quantity of fuel to be injected into a cylinder;
   a suitable sensor for determining loading on the engine; and
   a controller which outputs an instruction for said actuator to cause an actual fuel injection timing to be behind the specified fuel injection timing and hence to increase exhaust gas temperature at a high-idle running to be higher than the specified exhaust gas temperature.

2. Apparatus in accordance with claim 1, wherein said sensor comprises an engine speed sensor for detecting a rotational speed of said engine.

3. Apparatus in accordance with claim 1, wherein said sensor comprises a torque sensor for detecting a load torque of said engine.

4. Apparatus in accordance with claim 1, further comprising a generator which is driven by said engine, and wherein said sensor comprises a current sensor for measuring a load current of said generator.

5. Apparatus in accordance with claim 1, wherein when a high-idle speed at a time of loading becomes lower than a specified threshold, said controller outputs instructions for said actuator to cause the actual fuel injection timing to be equal to or ahead of the specified fuel injection timing and to maximize the quantity of fuel to be injected into a cylinder.

6. Apparatus in accordance with claim 1, wherein when a loading on the engine becomes more than a specified threshold, said controller outputs instructions for said actuator to cause the actual fuel injection timing to be equal to or ahead of the specified fuel injection timing as well as to maximize the quantity of fuel to be injected into a cylinder.

7. Apparatus in accordance with claim 1, wherein when a high-idle speed at a time of loading becomes lower than a specified threshold or the loading on the engine becomes more than a specified threshold, said controller outputs instructions for said actuator to cause the actual fuel injection timing to be equal to or ahead of the specified fuel injection timing as well as to maximize the quantity of fuel to be injected into a cylinder.

8. Apparatus in accordance with claim 7, wherein said sensor comprises an engine speed sensor for detecting a rotational speed of said engine.

9. Apparatus in accordance with claim 7, wherein said sensor comprises a torque sensor for detecting a load torque of said engine.

10. Apparatus in accordance with claim 7, further comprising a generator which is driven by said engine, and wherein said sensor comprises a current sensor for measuring a load current of said generator.

11. A method of controlling fuel injection to an engine having at least one cylinder and a supercharger, said method comprising the steps of:

injecting a specified quantity of fuel into a cylinder at a specified fuel injection timing and discharging exhaust gas from said engine at a specified exhaust gas temperature when the engine is running at an unloaded high-idle speed;

causing an actual fuel injection timing to be behind the specified fuel injection timing and hence increasing the exhaust gas temperature at a high-idle-running to be higher than the specified exhaust gas temperature; and when a high-idle speed at a time of loading becomes lower than a specified threshold, causing the actual fuel injection timing to be equal to or ahead of the specified fuel injection timing, and maximizing the quantity of fuel being injected into a cylinder.

12. A method of controlling fuel injection to an engine having at least one cylinder and a supercharger, said method comprising the steps of:

injecting a specified quantity of fuel into a cylinder at a specified fuel injection timing and discharging exhaust gas from said engine at a specified exhaust gas temperature when the engine is running at an unloaded high-idle speed;

causing an actual fuel injection timing to be behind the specified fuel injection timing and hence increasing the exhaust gas temperature at a high-idle running to be higher than the specified exhaust gas temperature; and when a loading on the engine becomes more than a specified threshold, causing the actual fuel injection timing to be equal to or ahead of the specified fuel injection timing, and maximizing the quantity of fuel being injected into a cylinder.

\* \* \* \* \*